United States Patent [19]
Munakata et al.

[11] Patent Number: 6,060,420
[45] Date of Patent: *May 9, 2000

[54] COMPOSITE OXIDES OF A-SITE DEFECT TYPE PEROVSKITE STRUCTURE AS CATALYSTS

[75] Inventors: Fumio Munakata; Hiroaki Kaneko; Takeshi Miyamoto, all of Yokohama, Japan

[73] Assignee: Nissan Motor Co., Ltd., Yokohama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/536,185

[22] Filed: Sep. 29, 1995

[30] Foreign Application Priority Data

| Oct. 4, 1994 | [JP] | Japan | 6-240106 |
| Oct. 31, 1994 | [JP] | Japan | 6-267223 |
| Jul. 14, 1995 | [JP] | Japan | 7-178658 |

[51] Int. Cl.[7] .............. B01J 23/00; B01J 23/32; B01J 23/40; B01J 23/42

[52] U.S. Cl. ............ 502/302; 502/303; 502/304; 502/324; 502/325; 502/326; 502/327; 502/328; 502/330; 502/331; 502/332; 502/333; 502/335; 502/336; 502/337; 502/338; 502/339; 502/340; 502/341; 502/344; 502/345; 502/346; 502/349; 502/350; 502/351; 502/355; 502/525

[58] Field of Search ................... 502/302, 303, 502/304, 525, 324, 325–327, 328, 330, 331, 332, 333, 335, 336, 337, 338, 339, 340, 341, 344–346, 349–351, 355; 423/213.2, 213.5, 239.1

[56] References Cited

U.S. PATENT DOCUMENTS

| 4,049,583 | 9/1977 | Lauder | 423/263 |
| 4,696,810 | 9/1987 | Shiraski et al. | 423/263 |
| 5,242,881 | 9/1993 | Tang et al. | 502/303 |
| 5,411,767 | 5/1995 | Soma et al. | 427/115 |
| 5,503,815 | 4/1996 | Ishii et al. | 423/263 |
| 5,556,818 | 9/1996 | Kohler et al. | 501/138 |

FOREIGN PATENT DOCUMENTS

| 2-74505 | 3/1990 | Japan . | |
| 5-9057 | 1/1993 | Japan | 423/263 |
| 7-136518 | 5/1995 | Japan . | |

OTHER PUBLICATIONS

Translation of JP 05–009057, Jan. 1993.
Yoshioka, H. "X-ray diffraction analysis for . . . sol-gel method," J. Mater. Res. 9(8), Aug., 1994, pp. 2133–37.
Higuchi et al., Changes in the Phases and Electrical Conduction Properties of $(La_{1-x}Sr_x)_{1-y}MnO_{3-\delta}$, J. Electrochem. Soc. 138(5): 1519–1523 (1991), No Month.

Primary Examiner—Steven Bos
Attorney, Agent, or Firm—Foley, Lardner

[57] ABSTRACT

A novel composite oxide has an A-site defect type perovskite structure represented by a general formula:

$$A_{1-\alpha}BO_{3-\delta}$$

wherein A is at least one element selected from the group consisting of alkali metals, alkaline earth metals, rare earth elements, Y and Pb, and B is at least one element selected from the group consisting of Ti, Mn, Fe, Co, Ni, Cu and Al, and $\alpha$ is $0<\alpha<0.2$ and $\delta$ is $0 \leq \delta \leq 1$, provided that only a known perovskite type oxide $(La_{1-x}Sr_x)_{1-\alpha}MnO_{3-\delta}$ (when $\alpha$ is 0.06, x is $0.08 \leq x \leq 0.30$, while when the value of x is 0.11, $\alpha$ is $0.06<\alpha<0.11$) is excluded.

9 Claims, 5 Drawing Sheets

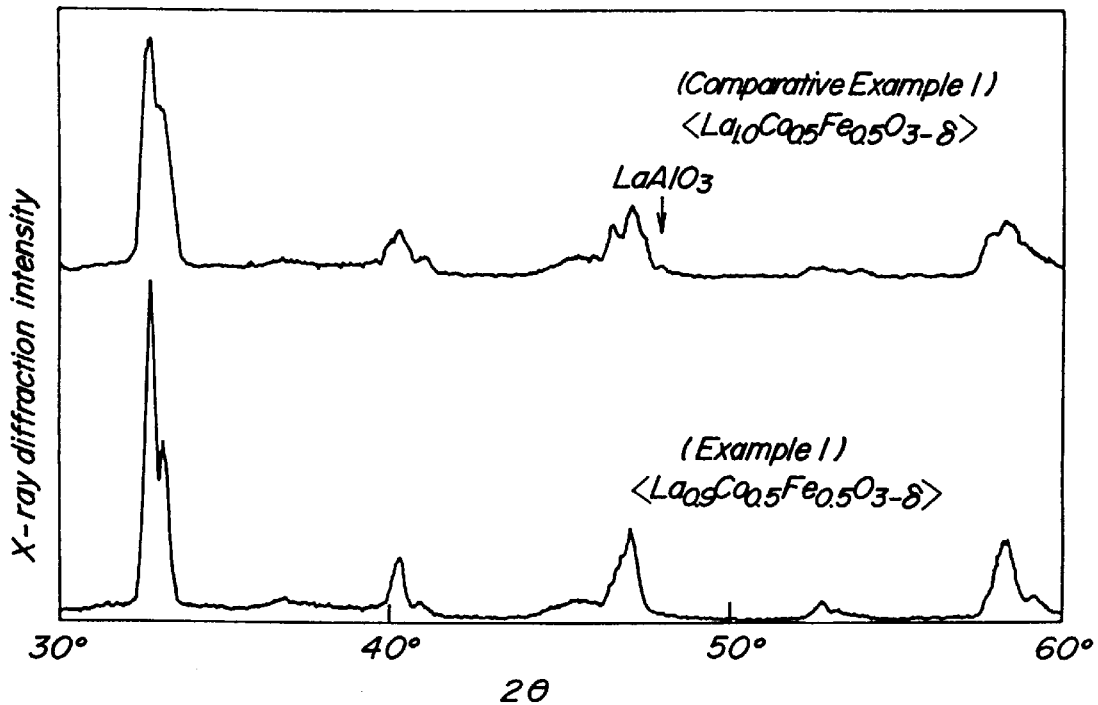
FIG_1a
Endurance conditions: 900°C x 5 hours
(Comparative Example 1)
$\langle La_{1.0}Co_{0.5}Fe_{0.5}O_{3-\delta}\rangle$
$LaAlO_3$
(Example 1)
$\langle La_{0.9}Co_{0.5}Fe_{0.5}O_{3-\delta}\rangle$
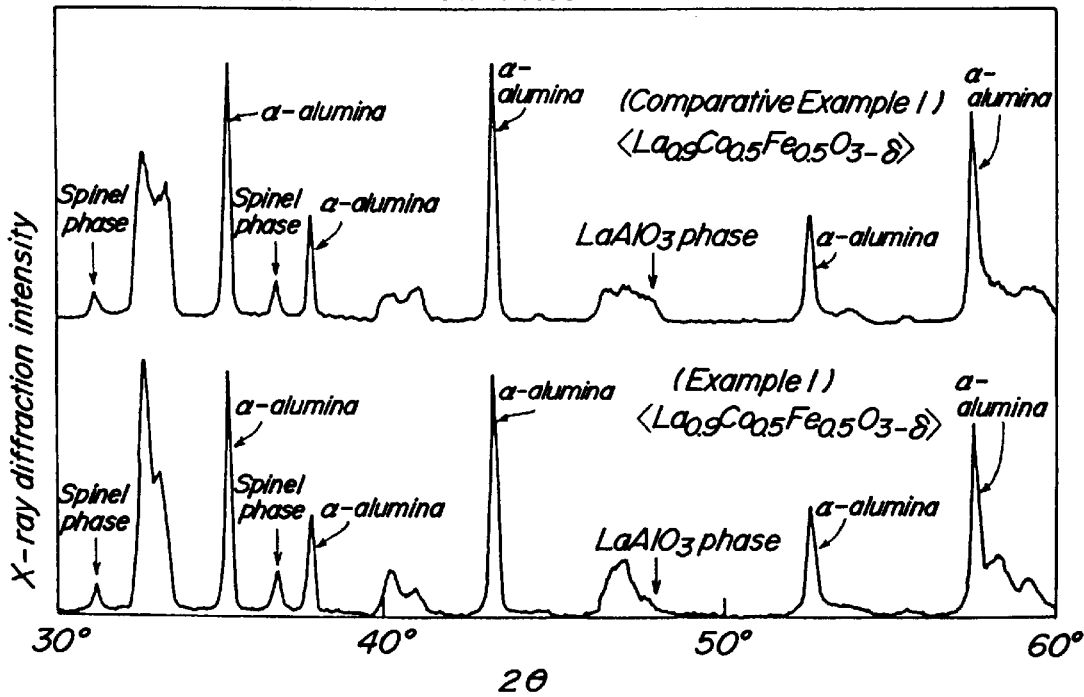
FIG_1b
Endurance conditions: 1100°C x 5 hours
(Comparative Example 1)
$\langle La_{0.9}Co_{0.5}Fe_{0.5}O_{3-\delta}\rangle$
(Example 1)
$\langle La_{0.9}Co_{0.5}Fe_{0.5}O_{3-\delta}\rangle$

FIG_3

COMPOSITE OXIDES OF A-SITE DEFECT TYPE PEROVSKITE STRUCTURE AS CATALYSTS

BACKGROUND OF THE INVENTION

1. Field of the Invention

This invention relates to novel composite oxides of A-site defect type perovskite structure, and more particularly to a novel composite oxide of A-site defect type perovskite structure suitable for use in catalysts for the purification of an exhaust gas discharged from an internal combustion engine of automobiles or the like, catalysts for the combustion of natural gas or the like, catalysts for the absorption and purification of harmful substance such as nitrogen oxides or the like, and electrode materials for solid electrolyte such as zirconia, ceria or the like used in an oxygen sensor or a fuel cell.

2. Description of the Related Art

As the catalyst for the purification of the exhaust gas discharged from the internal combustion engine of the automobile, there have mainly been used ones obtained by carrying noble metals such as platinum, rhodium, palladium and the like on a carrier substrate such as alumina or the like. Particularly, rhodium was used as an essential component for purifying NOx, but is an expensive catalytic material because it is lacking in natural resources.

Recently, levels in quality and quantity required for the purification of the exhaust gas are rising with an increase of consciousness for environments on worldwide scale. Under such situations, the demand of noble metals is extended and hence the shortage and the further rise of cost accompanied therewith are apprehended.

Under the above circumstances, it is attempted to apply palladium, which is relatively rich in natural resources and cheap in the cost, to a catalyst for the purification of the exhaust gas.

In general, it is known that when palladium is used as a catalytic component, reduction of palladium oxide is generated at a high temperature region and hence the NOx purification performance as a palladium catalyst is not sufficiently obtained. In this connection, it has been confirmed that it is effective to select a composite oxide of perovskite structure represented by a rational formula of $ABO_3$ and add it as a cocatalyst for improving the NOx purification performance of palladium (JP-A-7-136,518 opened May 30, 1995).

However, when such a perovskite type oxide is used as a catalyst or a cocatalyst and carried on alumina as a carrier substrate, if it is used at a high temperature region for a long period of time, the perovskite type oxide reacts with alumina to cause the decrease of specific surface area and the degradation of catalytic performances in the perovskite type oxide.

On the other hand, even if the perovskite type oxide is highly dispersed onto the surface of zirconia substrate to improve the catalytic activity, the degradation is less as compared with the case of carrying on the alumina, but solid phase reaction between perovskite type oxide and zirconia is created at the high temperature region and hence the satisfactory dispersion effect may not be obtained (N. Mizuno et al., J. Am. Chem. Soc., vol. 114, 1992, page 7151).

Particularly, a perovskite type oxide composed mainly of Co is decomposed at a higher temperature in a reducing atmosphere. For this end, it is attempted to include strontium into the perovskite type oxide for improving the catalytic activity through valency control. In this case, it is pointed out that the deactivation is caused by reacting strontium with palladium as a catalytic component at a high temperature (Tanaka and Takahashi, Journal of the Society of Automotive Engineers of Japan, vol. 47, 1993, p51).

Therefore, in order to suppress the degradation of properties at high temperature region in such a perovskite type oxide catalyst composed mainly of Co to improve the durability thereof, it is attempted to simultaneously establish the durability and the catalytic activity by using, for example, $La_{0.9}Ce_{0.1}Co_{0.4}Fe_{0.6}O_{3-\delta}$ in which an amount of Fe effective for the improvement of resistance to reducing performance is increased and strontium is replaced with cerium as a catalytic component, and using $(Ce, Zr, Y)O_2$ substrate hardly reacting with perovskite type oxide for controlling solid phase reaction (Tanaka and Takahashi, Journal of the Society of Automotive Engineers of Japan, vol. 47, 1993, p51).

However, when the perovskite type oxide containing a great amount of Fe is used for improving the thermal resistance, it is difficult to sufficiently obtain a catalytic activity from a low temperature region of an exhaust gas and hence the amount of noble metal used is undesirably increased.

Furthermore, if it is intended to select the composition of the substrate and improve the durability without causing the degradation of properties under severer conditions for coping with the buildup of emission control in North America and Europe and the severer buildup of emission control anticipated in future, the existing perovskite type oxides themselves have limit in use environments.

Moreover, since characteristics of constituent element such as strontium, cerium or the like in the perovskite type oxide appear in the catalytic activity, even if it is intended to prepare a catalyst by utilizing the characteristics of such a perovskite type oxide on the catalytic activity, it is required to control the interaction between the constituent element and noble metal catalyst as far as possible for controlling the degradation of the catalytic activity in the noble metal through the constituent element.

Therefore, it is important to design catalyst materials for the improvement of catalytic activity and durability in the perovskite type oxide itself by utilizing the activity of the perovskite type oxide to effectively conduct valency control.

And also, the perovskite type oxide has recently been used as an electrode material for fuel cell, oxygen sensor or the like, for example, an electrode material for oxygen ion conductor such as stabilized zirconia, ceria or the like. This perovskite type oxide is a mixed ion conductor having a small specific resistivity and a large oxygen ion conductivity. Particularly, it is known that the oxide including a 3d transition element such as Co, Mn or the like is cheap in the cost as compared with a platinum electrode and is possible to operate at a low temperature when using as an electrode material for the oxygen sensor (Y. Takeda, R. Kanno, Y. Tomida and O. Yamamoto, J. Electrochem. Soc., vol. 134, No. 11, 1987, p2656).

In general, when an electrode of a metal such as platinum or the like is used as an electrode material for the oxygen sensor, the penetration of oxygen ion into a solid electrolyte occurs only at a restricted three-phase interface of gas phase, electrode and electrolyte. On the other hand, it has been confirmed that since the penetration of oxygen ion may be caused even at a two-phase interface between electrode and solid electrolyte in an electron-ion mixed conductor electrode, the perovskite type oxide may be a high-performance electrode material operable at a low temperature because a resistance of electrode reaction at an interface between solid electrolyte and perovskite type oxide can be reduced (H. Arai, K. Eguchi and T. Inoue, Proc. of the Symposium on Chemical Sensors (Hawaii), 87–9 (1987), p2247).

Among the perovskite type oxides used as an electrode material, however, a high activity material (La—Co—O system) reacts with zirconia or ceria solid electrolyte during the use for a long time at a high temperature region or under a reducing atmosphere to increase a reaction resistance at an interface between solid electrolyte and perovskite type oxide. As a result, power generation efficiency is decreased in the fuel cell, or the decrease of response velocity and occurrence of abnormal power output are caused in the sensor used at the high temperature region and finally the inoperable state may be caused.

Particularly, the perovskite type oxide can be used as the electrode material for the fuel cell or the oxygen sensor by utilizing the catalytic action and electric conductivity of such an oxide. In this case, however, it is necessary to control the degradation of properties through chemical reaction at the interface between solid electrolyte and electrode material, peeling through thermal stress and the like while maintaining the adhesion property therebetween.

In this connection, there is recently reported only a composite oxide of perovskite structure represented by a rational formula of $(La_{1-x}Sr_x)_{1-y}MnO_{3-\delta}$ usable as an electrode material wherein when y is 0.06, x is $0.08 \leq x \leq 0.30$ and when the value of x is 0.11, y is $0.06 < y < 0.11$ (T. Higuchi, M. Miyayama and H. Yanagida, J. Electrochem. Soc., vol. 138, No. 5, 1991, pp1519–1523).

SUMMARY OF THE INVENTION

It is, therefore, an object of the invention to provide a novel composite oxide of A-site defect type perovskite structure, particularly A-site defect type perovskite composite oxides suitable for use in catalysts and electrode materials which control the solid phase reaction to improve the durability and thermal resistance and can move oxygen vacancy produced through valency control in crystal lattices at a high speed.

The inventors have made various studies with respect to the composite oxides of perovskite structure and found that novel composite oxides of A-site defect type perovskite structure represented by a general formula of $A_{1-\alpha}BO_{3-\delta}$ wherein $0 < \alpha < 0.2$ preferably $0.12 \leq \alpha \leq 0.15$ and $0 \leq \alpha \leq 1$ are effective for use in catalysts and electrode materials and as a result, the invention has been accomplished.

According to the invention, there is the provision of a composite oxide of A-site defect type perovskite structure represented by a general formula:

$$A_{1-\alpha}BO_{3-\delta}$$

wherein A is at least one element selected from the group consisting of alkali metals, alkaline earth metals, rare earth elements, Y and Pb, and B is at least one element selected from the group consisting of Ti, Mn, Fe, Co, Ni, Cu and Al, and $\alpha$ is $0 < \alpha < 0.2$ and $\delta$ is $0 \leq \delta \leq 1$, provided that only a known perovskite type oxide $(La_{1-x}Sr_x)_{1-\alpha}MnO_{3-\delta}$ (when $\alpha$ is 0.06, x is $0.08 \leq x \leq 0.30$, while when the value of x is 0.11, $\alpha$ is $0.06 < \alpha < 0.11$) is excluded.

In a preferred embodiment of the invention, A in the general formula is at least one element selected from the group consisting of La, Pr, Ce, Nd, Gd, Y, Ba, Sr, Ca, K and Pb.

In another preferred embodiment of the invention, the composite oxide of A-site defect type perovskite structure is represented by the following general formula:

$$(A'_{1-x}A''_x)_{1-\alpha}(B'_{1-y}B''_y)O_{3-\delta}$$

wherein A' is at least one element selected from the group consisting of La, Nd, Gd and Y, and A'' is at least one element selected from the group consisting of Pr, Ce, Ba, Sr, Ca, K and Pb, and B' and B'' are different and are at least one element selected from the group consisting of Mn, Co, Ti, Fe, Ni, Cu and Al, and $0 < \alpha < 0.2$, $0 \leq \delta \leq 1$, $0 < x1$ and $0 < y < 1$.

In the other preferred embodiment of the invention, $\alpha$ is $0.1 < \alpha < 0.15$.

BRIEF DESCRIPTION OF THE DRAWINGS

FIGS. 1a and 1b are X-ray diffraction patterns of perovskite type composite oxide—alumina mixed powder endured at 900° C. and 1100° C., respectively, for the comparison between the conventional perovskite type oxide $La_{1.0}Co_{0.5}Fe_{0.5}O_{3-\delta}$ (Comparative Example 1) and A-site defect type perovskite structure composite oxide $La_{0.9}Co_{0.5}Fe_{0.5}O_{3-\delta}$ according to the invention (Example 1);

DESCRIPTION OF THE PREFERRED EMBODIMENTS

Figure 2:
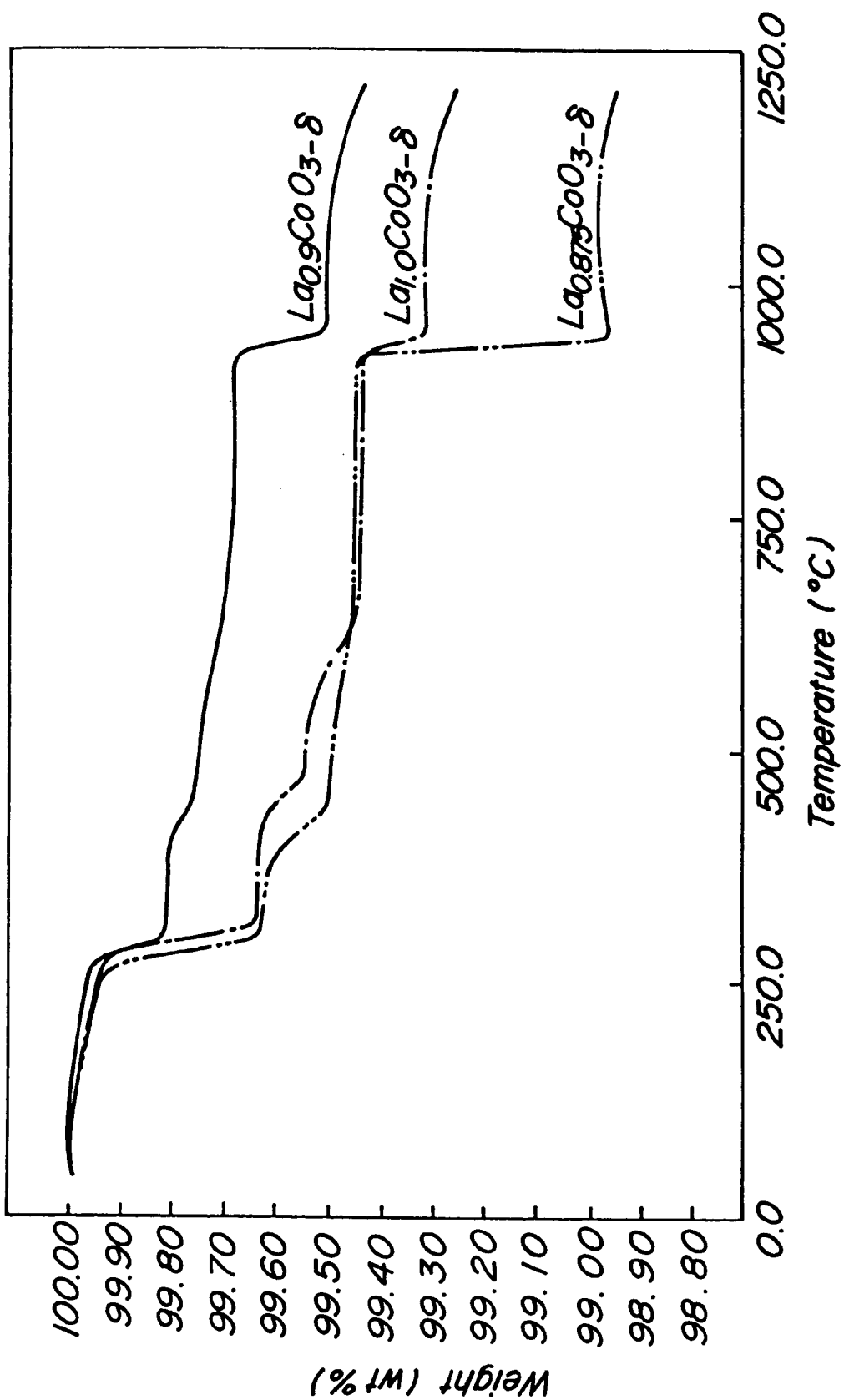
FIG. 2 is a graph showing results of thermogravimetric analysis on the conventional perovskite type oxide $La_{1.0}Co_{1.0}O_{3-\delta}$ (Comparative Example 7) and A-site defect type perovskite structure composite oxides $La_{0.9}Co_{1.0}O_{3-\delta}$ and $La_{0.875}Co_{1.0}O_{3-\delta}$ according to the invention (Examples 11 and 22)

The novel composite oxides according to the invention have an A-site defect type perovskite structure represented by the general formula of $A_{1-\alpha}BO_{3-\delta}$ other than only the known perovskite type oxide $(La_{1-x}Sr_x)_{1-\alpha}MnO_{3-\delta}$ as previously mentioned, in which A is at least one element selected from the group consisting of alkali metals, alkaline earth metals, rare earth elements, Y and Pb, and B is at least one element selected from the group consisting of Ti, Mn, Fe, Co, Ni, Cu and Al, $\alpha$ and $\delta$ are $0 < \alpha < 0.2$ and $0 \leq \delta \leq 1$.

When the A-site defect amount $\alpha$ is $0 < \alpha < 0.2$, the stabilization of perovskite structure is attained and also the introduction of oxygen vacancy playing an important role for the catalytic action is promoted by the valency control through A-site defect. On the other hand, when the oxygen vacancy amount $\delta$ is $0 \leq \delta \leq 1$, the perovskite structure is most stable and the maintenance of oxygen desorption and absorption performance and the improvement of durability can be realized. If the A-site defect amount $\alpha$ is not less than 0.2, a precipitation amount of a secondary phase undesirably increases to considerably degrade oxygen desorption and absorption performance of the composite oxide. Preferably, α is $0.1<\alpha<0.15$. In the latter case, the oxygen desorption and absorption performance is considerably improved at a temperature region of not higher than 700° C., but if the value of α becomes not less than 0.15, the precipitation of the secondary phase is apt to be started to make the perovskite structure unstable.

Particularly, when the general formula of $A_{1-\alpha}BO_{3-\delta}$ is changed into a general formula of $(A'_{1-x}A''_x)_{1-\alpha}(B'_{1-y}B''_y)O_{3-\delta}$ in which A' is at least one element selected from the group consisting of La, Nd, Gd and Y, and A" is at least one element selected from the group consisting of Pr, Ce, Ba, Sr, Ca, K and Pb, and B' and B" are different and are at least one element selected from the group consisting of Mn, Co, Ti, Fe, Ni, Cu and Al, and $0<\alpha<0.2$ preferably $0.12 \alpha \leq 0.15$, $0 \leq \delta \leq 1$, $0<x<1$ and $0<y<1$, the electron state of B-site is controlled by valency control of changing x and y in the combination of A-site and B-site elements, whereby the oxygen desorption and absorption performance, thermal resistance and durability of the composite oxide can be improved. When such a composite oxide is used as a catalyst, the catalytic activity is considerably improved, while when it is used as an electrode material for solid electrolyte in an oxygen sensor, an internal resistance at an interface between solid electrolyte and electrode material can be reduced to lower the operation starting temperature of the electrode material.

In case of using the composite oxide according to the invention as a catalyst, when A" is at least one element selected from the group consisting of Pr, Ce, Ba, Sr, Ca and K and B' is Co and B" is at least one element selected from the group consisting of Mn, Fe, Ni and Al, or when A' is at least one element selected from the group consisting of Pr, Ce, Ba, Sr, Ca and K and B' is Mn and B" is at least one element selected from the group consisting of Fe, Ti and Cu, the thermal resistance and durability can be improved while maintaining the catalytic activity inherent to Co or Mn. Furthermore, when at least Pd as a noble metal is carried on such a composite oxide, the stabilization of an element badly exerting upon Pd is attained to control the interaction with Pd and also the thermal resistance and durability can be improved, whereby an improved three-way catalyst for the purification of exhaust gas can be provided.

In case of using the composite oxide according to the invention as an electrode material for solid electrolyte, when A' is at least one element selected from the group consisting of La, Nd and Y and A' is at least one element selected from the group consisting of Ba, Sr and Ca and B' is Co and B" is at least one element selected from the group consisting of Mn, Fe, Ni and Cu, or when A' is at least one element selected from the group consisting of La, Nd and Y and A" is at least one element selected from the group consisting of Ba, Sr and Ca and B' is Mn and B" is Fe and/or Cu, an internal resistance at an interface between solid electrolyte and electrode material can considerably be reduced to lower the operation starting temperature of the electrode material and the thermal resistance and durability can be improved. Furthermore, when 2–20 parts by weight of a fluorite type oxide such as ceria ($Ce_{0.9}Ca_{0.1}O_{2-x}$ or the like), zirconia ($Zr_{0.9}Y_{0.1}O_{2-x}$ or the like) or a mixture thereof is added to 100 parts by weight of the above composite oxide, the sintering of the perovskite type oxide itself can be controlled to more improve the thermal resistance and the durability even in use at a temperature region of not lower than 1200° C.

The following examples are given in illustration of the invention and are not intended as limitations thereof.

EXAMPLE 1

Composite oxide powder of A-site defect type perovskite structure represented by $La_{0.9}Co_{0.5}Fe_{0.5}O_{3-\delta}$ is prepared by the following method (which is substantially the same as disclosed in JP-A-2-74505).

Powders of carbonates or hydroxides of lanthanum, cobalt and iron (average particle size: about 2–3 μm) as a starting material are mixed at a molar ratio of La:Co:Fe=9:5:5 and pulverized in a ball mill (average particle size of mixed powder after pulverization: about 1 μm).

100 parts by weight of the resulting mixed powder is added with about 64 parts by weight of citric acid and 400 parts by weight of pure water and reacted at 60° C.±5° C.

After the completion of the reaction, the resulting slurry is dehydrated at 120° C. to obtain a composite citrate. The thus obtained citrate is calcined at 600° C. in air for 1 hour and fired at 1100° C. for 5 hours to obtain composite oxide powder of $La_{0.9}Co_{0.5}Fe_{0.5}O_{3-\delta}$.

In the following examples and comparative examples, composite oxide powder of perovskite structure is prepared by the same method as in Example 1 except that kinds and mixing molar ratio of carbonates and hydroxides as the starting material are changed, otherwise specified.

EXAMPLE 2

Composite oxide powder of A-site defect type perovskite structure represented by $La_{0.875}Co_{0.5}Fe_{0.5}O_{3-\delta}$ is prepared in the same manner as in Example 1.

EXAMPLE 3

Composite oxide powder of A-site defect type perovskite structure represented by $La_{0.85}Co_{0.5}Fe_{0.5}O_{3-\delta}$ is prepared in the same manner as in Example 1.

EXAMPLE 4

Composite oxide powder of A-site defect type perovskite structure represented by $La_{0.81}Ce_{0.09}Co_{0.5}Fe_{0.5}O_{3-\delta}$ is prepared in the same manner as in Example 1.

EXAMPLE 5

Composite oxide powder of A-site defect type perovskite structure represented by $La_{0.72}Sr_{0.18}Co_{0.5}Fe_{0.5}O_{3-\delta}$ is prepared in the same manner as in Example 1.

EXAMPLE 6

Composite oxide powder of A-site defect type perovskite structure represented by $La_{0.81}K_{0.09}Co_{0.5}Fe_{0.5}O_{3-\delta}$ is prepared in the same manner as in Example 1.

EXAMPLE 7

Composite oxide powder of A-site defect type perovskite structure represented by $La_{0.72}Ba_{0.18}Co_{0.5}Fe_{0.5}O_{3-\delta}$ is prepared in the same manner as in Example 1.

EXAMPLE 8

Composite oxide powder of A-site defect type perovskite structure represented by $La_{0.81}Pb_{0.09}Co_{0.5}Fe_{0.5}O_{3-\delta}$ is prepared in the same manner as in Example 1.

EXAMPLE 9

Composite oxide powder of A-site defect type perovskite structure represented by $La_{0.81}Pr_{0.09}Co_{0.5}Fe_{0.5}O_{3-\delta}$ is prepared in the same manner as in Example 1.

EXAMPLE 10

Composite oxide powder of A-site defect type perovskite structure represented by $La_{0.9}Co_{0.8}Fe_{0.2}O_{3-\delta}$ is prepared in the same manner as in Example 1.

EXAMPLE 11

Composite oxide powder of A-site defect type perovskite structure represented by $La_{0.9}Co_{1.0}O_{3-\delta}$ is prepared in the same manner as in Example 1.

EXAMPLE 12

Composite oxide powder of A-site defect type perovskite structure represented by $Nd_{0.9}Mn_{1.0}O_{3-\delta}$ is prepared in the same manner as in Example 1.

EXAMPLE 13

Composite oxide powder of A-site defect type perovskite structure represented by $La_{0.9}Mn_{1.0}O_{3-\delta}$ is prepared in the same manner as in Example 1.

EXAMPLE 14

Composite oxide powder of A-site defect type perovskite structure represented by $La_{0.9}Mn_{0.5}Fe_{0.5}O_{3-\delta}$ is prepared in the same manner as in Example 1.

EXAMPLE 15

Composite oxide powder of A-site defect type perovskite structure represented by $La_{0.81}K_{0.09}Mn_{0.8}Cu_{0.2}O_{3-\delta}$ is prepared in the same manner as in Example 1.

EXAMPLE 16

Composite oxide powder of A-site defect type perovskite structure represented by $Y_{0.81}Ca_{0.09}Mn_{1.0}O_{3-\delta}$ is prepared in the same manner as in Example 1.

EXAMPLE 17

Composite oxide powder of A-site defect type perovskite structure represented by $La_{0.81}Sr_{0.09}Mn_{0.9}Ti_{0.1}O_{3-\delta}$ is prepared in the same manner as in Example 1 except that citrate of Ti is used as a starting material.

EXAMPLE 18

Composite oxide powder of A-site defect type perovskite structure represented by $Gd_{0.875}Mn_{1.0}O_{3-\delta}$ is prepared in the same manner as in Example 1.

EXAMPLE 19

Composite oxide powder of A-site defect type perovskite structure represented by $La_{0.47}Sr_{0.47}Co_{0.98}Ni_{0.02}O_{3-\delta}$ is prepared in the same manner as in Example 1.

EXAMPLE 20

Composite oxide powder of A-site defect type perovskite structure represented by $La_{0.7}Sr_{0.175}Co_{0.8}Fe_{0.2}O_{3-\delta}$ is prepared in the same manner as in Example 1.

EXAMPLE 21

Composite oxide powder of A-site defect type perovskite structure represented by $La_{0.81}Sr_{0.09}Co_{0.95}Al_{0.05}O_{3-\delta}$ is prepared in the same manner as in Example 1.

EXAMPLE 22

Composite oxide powder of A-site defect type perovskite structure represented by $La_{0.81}Ba_{0.09}Co_{0.5}Mn_{0.5}O_{3-\delta}$ is prepared in the same manner as in Example 1.

EXAMPLE 23

Carbonate powders of lanthanum and cobalt (average particle size: about 2–3 μm) are mixed at a molar ratio of La:Co=8.75:10 and pulverized in a ball mill (average particle size of mixed powder after pulverization: about 1 μm). Then, the resulting mixed powder is treated in the same manner as in Example 1 to obtain composite oxide powder of $La_{0.875}CoO_{3-\delta}$.

EXAMPLE 24

Composite oxide powder of A-site defect type perovskite structure represented by $La_{0.875}MnO_{3-\delta}$ is prepared in the same manner as in Example 23.

EXAMPLE 25

Composite oxide powder of A-site defect type perovskite structure represented by $La_{0.78}Ce_{0.1}Co_{0.5}Fe_{0.5}O_{3-\delta}$ is prepared in the same manner as in Example 23.

EXAMPLE 26

Composite oxide powder of A-site defect type perovskite structure represented by $La_{0.78}Sr_{0.1}Co_{0.5}Fe_{0.5}O_{3-\delta}$ is prepared in the same manner as in Example 23.

EXAMPLE 27

Composite oxide powder of A-site defect type perovskite structure represented by $La_{0.78}K_{0.1}Co_{0.5}Fe_{0.5}O_{3-\delta}$ is prepared in the same manner as in Example 23.

EXAMPLE 28

Composite oxide powder of A-site defect type perovskite structure represented by $La_{0.78}Ba_{0.1}Co_{0.5}Fe_{0.5}O_{3-\delta}$ is prepared in the same manner as in Example 23.

EXAMPLE 29

Composite oxide powder of A-site defect type perovskite structure represented by $La_{0.78}Pb_{0.1}Co_{0.5}Fe_{0.5}O_{3-\delta}$ is prepared in the same manner as in Example 23.

EXAMPLE 30

Composite oxide powder of A-site defect type perovskite structure represented by $Nd_{0.875}MnO_{3-\delta}$ is prepared in the same manner as in Example 23.

EXAMPLE 31

Composite oxide powder of A-site defect type perovskite structure represented by $La_{0.455}Ba_{0.42}Mn_{0.5}Fe_{0.5}O_{3-\delta}$ is prepared in the same manner as in Example 23.

EXAMPLE 32

Composite oxide powder of A-site defect type perovskite structure represented by $La_{0.78}K_{0.1}Mn_{0.8}Cu_{0.2}O_{3-\delta}$ is prepared in the same manner as in Example 23.

EXAMPLE 33

Composite oxide powder of A-site defect type perovskite structure represented by $Y_{0.78}Ca_{0.1}MnO_{3-\delta}$ is prepared in the same manner as in Example 23.

EXAMPLE 34

Composite oxide powder of A-site defect type perovskite structure represented by $La_{0.78}Sr_{0.1}Mn_{0.9}Ti_{0.1}O_{3-\delta}$ is prepared in the same manner as in Example 23 except that oxalate of Ti is used as a starting material.

EXAMPLE 35

Composite oxide powder of A-site defect type perovskite structure represented by $Gd_{0.78}Pr_{0.1}MnO_{3-\delta}$ is prepared in the same manner as in Example 23.

EXAMPLE 36

Composite oxide powder of A-site defect type perovskite structure represented by $La_{0.44}Sr_{0.44}Co_{0.98}Ni_{0.02}O_{3-\delta}$ is prepared in the same manner as in Example 23.

EXAMPLE 37

Composite oxide powder of A-site defect type perovskite structure represented by $La_{0.78}Sr_{0.1}Co_{0.95}Al_{0.95}O_{3-\delta}$ is prepared in the same manner as in Example 23 except that hydroxide of Al is used as a starting material.

EXAMPLE 38

Composite oxide powder of A-site defect type perovskite structure represented by $La_{0.78}Ba_{0.1}Co_{0.5}Mn_{0.5}O_{3-\delta}$ is prepared in the same manner as in Example 23.

EXAMPLE 39

Composite oxide powder of A-site defect type perovskite structure represented by $La_{0.81}Sr_{0.09}Co_{1.0}O_{3-\delta}$ is prepared by the following method (which is substantially the same as disclosed in JP-A-2-74505).

Powders of carbonates of lanthanum, strontium and cobalt (average particle size: about 2–3 μm) as a starting material are mixed at a molar ratio of La:Sr:Co=81:9:100 and pulverized in a ball mill (average particle size of mixed powder after pulverization: about 1 μm).

100 parts by weight of the resulting mixed powder is added with about 64 parts by weight of citric acid and 400 parts by weight of pure water and reacted at 60° C.±5° C.

After the completion of the reaction, the resulting slurry is dehydrated at 120° C. to obtain a composite citrate. The thus obtained composite citrate is calcined at 600° C. in air for 1 hour and fired at 800° C. for 5 hours to obtain composite oxide powder of $La_{0.81}Sr_{0.09}Co_{1.0}O_{3-\delta}$.

EXAMPLE 40

Composite oxide powder of A-site defect type perovskite structure represented by $La_{0.54}Sr_{0.36}Co_{1.0}O_{3-\delta}$ is prepared in the same manner as in Example 39.

EXAMPLE 41

Composite oxide powder of A-site defect type perovskite structure represented by $La_{0.54}Sr_{0.36}Co_{0.8}Fe_{0.2}O_{3-\delta}$ is prepared in the same manner as in Example 39 except that hydroxide of iron is used as a starting material.

EXAMPLE 42

Composite oxide powder of A-site defect type perovskite structure represented by $La_{0.54}Sr_{0.36}Co_{0.8}Mn_{0.2}O_{3-\delta}$ is prepared in the same manner as in Example 39.

EXAMPLE 43

Composite oxide powder of A-site defect type perovskite structure represented by $La_{0.54}Sr_{0.36}Co_{0.5}Mn_{0.5}O_{3-\delta}$ is prepared in the same manner as in Example 39.

EXAMPLE 44

Composite oxide powder of A-site defect type perovskite structure represented by $La_{0.54}Sr_{0.36}Co_{0.2}Mn_{0.8}O_{3-\delta}$ is prepared in the same manner as in Example 39.

EXAMPLE 45

Composite oxide powder of A-site defect type perovskite structure represented by $La_{0.81}Ba_{0.09}Co_{0.5}Fe_{0.5}O_{3-\delta}$ is prepared in the same manner as in Example 39 except that hydroxide of iron is used as a starting material.

EXAMPLE 46

Composite oxide powder of A-site defect type perovskite structure represented by $Nd_{0.54}Sr_{0.36}Mn_{0.8}Fe_{0.2}O_{3-\delta}$ is prepared in the same manner as in Example 39 except that hydroxide of iron is used as a starting material.

EXAMPLE 47

Composite oxide powder of A-site defect type perovskite structure represented by $La_{0.54}Sr_{0.36}Mn_{0.8}Cu_{0.2}O_{3-\delta}$ is prepared in the same manner as in Example 39.

EXAMPLE 48

Composite oxide powder of A-site defect type perovskite structure represented by $Y_{0.81}Ca_{0.09}Mn_{0.8}Co_{0.2}O_{3-\delta}$ is prepared in the same manner as in Example 39.

EXAMPLE 49

Composite oxide powder of A-site defect type perovskite structure represented by $La_{0.54}Sr_{0.36}Co_{0.9}Ni_{0.1}O_{3-\delta}$ is prepared in the same manner as in Example 39.

EXAMPLE 50

Composite oxide powder of A-site defect type perovskite structure represented by $La_{0.54}Sr_{0.36}Co_{1.0}O_{3-\delta}$ is prepared in the same manner as in Example 39. Furthermore, 100 parts by weight of this powder is added and mixed with 5 parts by weight of ceria powder ($CeO_{2-x}$).

EXAMPLE 51

Composite oxide powder of A-site defect type perovskite structure represented by $La_{0.54}Sr_{0.36}Co_{0.8}Mn_{0.2}O_{3-\delta}$ is prepared in the same manner as in Example 39. Furthermore, 100 parts by weight of this powder is added and mixed with 5 parts by weight of ceria powder ($CeO_{2-x}$).

EXAMPLE 52

Composite oxide powder of A-site defect type perovskite structure represented by $La_{0.54}Sr_{0.36}Co_{1.0}O_{3-\delta}$ is prepared in the same manner as in Example 39. Furthermore, 100 parts by weight of this powder is added and mixed with 5 parts by weight of ceria powder ($CeO_{2-x}$) and 5 parts by weight of zirconia powder ($Zr_{0.9}Y_{0.1}O_{2-x}$).

COMPARATIVE EXAMPLE 1

Composite oxide powder of perovskite structure represented by $La_{1.0}Co_{0.5}Fe_{0.5}O_{3-\delta}$ is prepared in the same manner as in Example 1.

COMPARATIVE EXAMPLE 2

Composite oxide powder of perovskite structure represented by $La_{0.9}Sr_{0.1}Co_{0.5}Fe_{0.5}O_{3-\delta}$ is prepared in the same manner as in Example 1.

COMPARATIVE EXAMPLE 3

Composite oxide powder of perovskite structure represented by $La_{0.9}K_{0.1}Co_{0.5}Fe_{0.5}O_{3-\delta}$ is prepared in the same manner as in Example 1.

COMPARATIVE EXAMPLE 4

Composite oxide powder of perovskite structure represented by $La_{0.8}Ba_{0.2}Co_{0.5}Fe_{0.5}O_{3-\delta}$ is prepared in the same manner as in Example 1.

COMPARATIVE EXAMPLE 5

Composite oxide powder of perovskite structure represented by $La_{0.9}Pb_{0.1}Co_{0.5}Fe_{0.5}O_{3-\delta}$ is prepared in the same manner as in Example 1.

COMPARATIVE EXAMPLE 6

Composite oxide powder of perovskite structure represented by $La_{1.0}Co_{0.8}Fe_{0.2}O_{3-\delta}$ is prepared in the same manner as in Example 1.

COMPARATIVE EXAMPLE 7

Composite oxide powder of perovskite structure represented by $La_{1.0}Co_{1.0}O_{3-\delta}$ is prepared in the same manner as in Example 1.

COMPARATIVE EXAMPLE 8

Composite oxide powder of perovskite structure represented by $Nd_{1.0}Mn_{1.0}O_{3-\delta}$ is prepared in the same manner as in Example 1.

COMPARATIVE EXAMPLE 9

Composite oxide powder of perovskite structure represented by $La_{1.0}Mn_{0.5}Fe_{0.5}O_{3-\delta}$ is prepared in the same manner as in Example 1.

COMPARATIVE EXAMPLE 10

Composite oxide powder of perovskite structure represented by $La_{0.9}K_{0.1}Mn_{0.8}Cu_{0.2}O_{3-\delta}$ is prepared in the same manner as in Example 1.

COMPARATIVE EXAMPLE 11

Composite oxide powder of perovskite structure represented by $Y_{0.9}Ca_{0.1}Mn_{1.0}O_{3-\delta}$ is prepared in the same manner as in Example 1.

COMPARATIVE EXAMPLE 12

Composite oxide powder of perovskite structure represented by $La_{0.9}Sr_{0.1}Mn_{0.9}Ti_{0.1}O_{3-\delta}$ is prepared in the same manner as in Example 1 except that oxalate of Ti is used as a starting material.

COMPARATIVE EXAMPLE 13

Composite oxide powder of perovskite structure represented by $Gd_{0.1}Mn_{1.0}O_{3-\delta}$ is prepared in the same manner as in Example 1.

COMPARATIVE EXAMPLE 14

Composite oxide powder of perovskite structure represented by $La_{0.5}Sr_{0.5}Co_{0.98}Ni_{0.02}O_{3-\delta}$ is prepared in the same manner as in Example 1.

COMPARATIVE EXAMPLE 15

Composite oxide powder of perovskite structure represented by $La_{0.8}Sr_{0.2}Co_{0.8}Fe_{0.2}O_{3-\delta}$ is prepared in the same manner as in Example 1.

COMPARATIVE EXAMPLE 16

Composite oxide powder of perovskite structure represented by $La_{0.9}Sr_{0.1}Co_{0.95}Al_{0.05}O_{3-\delta}$ is prepared in the same manner as in Example 1.

COMPARATIVE EXAMPLE 17

Composite oxide powder of perovskite structure represented by $La_{0.9}Ba_{0.1}Co_{0.5}Mn_{0.5}O_{3-\delta}$ is prepared in the same manner as in Example 1.

COMPARATIVE EXAMPLE 18

Composite oxide powder of perovskite structure represented by $La_{1.0}Mn_{1.0}O_{3-\delta}$ is prepared in the same manner as in Example 23.

COMPARATIVE EXAMPLE 19

Composite oxide powder of perovskite structure represented by $La_{1.0}Co_{0.5}Fe_{0.5}O_{3-\delta}$ is prepared in the same manner as in Example 23.

COMPARATIVE EXAMPLE 20

Composite oxide powder of perovskite structure represented by $La_{0.9}Ce_{0.1}Co_{0.5}Fe_{0.5}O_{3-\delta}$ is prepared in the same manner as in Example 23.

COMPARATIVE EXAMPLE 21

Composite oxide powder of perovskite structure represented by $La_{0.9}Ba_{0.1}Co_{0.5}Fe_{0.5}O_{3-\delta}$ is prepared in the same manner as in Example 23.

COMPARATIVE EXAMPLE 22

Composite oxide powder of perovskite structure represented by $La_{0.5}Ba_{0.5}Mn_{0.5}Fe_{0.5}O_{3-\delta}$ is prepared in the same manner as in Example 23.

COMPARATIVE EXAMPLE 23

Composite oxide powder of perovskite structure represented by $La_{0.8}Sr_{0.2}Co_{1.0}O_{3-\delta}$ is prepared in the same manner as in Example 39.

COMPARATIVE EXAMPLE 24

Composite oxide powder of perovskite structure represented by $La_{0.6}Sr_{0.4}Co_{1.0}O_{3-\delta}$ is prepared in the same manner as in Example 39.

COMPARATIVE EXAMPLE 25

Composite oxide powder of perovskite structure represented by $La_{0.6}Sr_{0.4}Co_{0.8}Fe_{0.2}O_{3-\delta}$ is prepared in the same manner as in Example 39 except that hydroxide of iron is used as a starting material.

COMPARATIVE EXAMPLE 26

Composite oxide powder of perovskite structure represented by $La_{0.5}Sr_{0.5}Co_{0.5}Mn_{0.5}O_{3-\delta}$ is prepared in the same manner as in Example 39.

COMPARATIVE EXAMPLE 27

Composite oxide powder of perovskite structure represented by $Y_{0.9}Ca_{0.1}Co_{0.2}Mn_{0.8}O_{3-\delta}$ is prepared in the same manner as in Example 39.

COMPARATIVE EXAMPLE 28

Composite oxide powder of perovskite structure represented by $La_{0.6}Sr_{0.4}Co_{1.0}O_{3-\delta}$ is prepared in the same manner as in Example 39. Furthermore, 100 parts by weight of this powder is added and mixed with 5 parts by weight of ceria ($CeO_{2-x}$).

TEST EXAMPLE 1

The effect of controlling solid phase reaction between composite oxide and substrate is investigated with respect to composite oxide powders of Examples 1–11 and Comparative Examples 1–7. The solid reactivity to γ-alumina as a substrate is judged by preparing a test sample and conducting evaluation under the following conditions.
(Process for the evaluation of solid phase reaction)
1) Preparation of Test Sample
(1) The composite oxide powder and γ-alumina are weighed so as to have a weight ratio of composite oxide powder: γ-alumina=1:2.
(2) These weighed powders are mixed in a mortar at a dry state for 1 hour.
(3) The mixed powder is shaped into a rectangular body of about 3 mm×5 mm×20 mm under a pressure of 1 ton/cm².
(4) The shaped body is endured by heating at 900° C. or 1100° C. in air for 5 hours.
2) Evaluation of Solid Phase Reaction Through X-ray Diffraction
(1) Measurement of intensity of X-ray diffraction peak in product phase
(2) Measurement of intensity ratio in X-ray diffraction peak between composite oxide and product phase An example of X-ray diffraction pattern after the solid phase reaction through endurance at 900 or 1100° C. is shown in FIGS. 1a and 1b with respect to the composite oxides of Example 1 and Comparative Example 1, respectively.

When the conventional perovskite type oxide $La_{1.0}Co_{0.5}Fe_{0.5}O_{3-\delta}$ (Comparative Example 1) is reacted with alumina under endurance condition of 900° C., the formation of $LaAlO_3$ phase is confirmed as shown in FIG. 1a. On the other hand, when the reaction is carried out under endurance condition of 1100° C., the serious formation of $LaAlO_3$ phase through solid phase reaction is observed in Comparative Example 1 as shown in FIG. 1b. On the contrary, in case of the A-site defect type perovskite structure composite oxide of $La_{0.9}Co_{0.5}Fe_{0.5}O_{3-\delta}$ according to the invention (Example 1), the formation of $LaAlO_3$ phase through solid phase reaction is suppressed as seen from the comparison of FIGS. 1a and 1b.

That is, it is considered that the decomposition of the composite oxide and the decrease of specific surface area accompanied therewith are caused by the progress of the solid phase reaction forming the $LaAlO_3$ phase to hence lower the catalytic activity of the perovskite type composite oxide. In other words, the formation of $LaAlO_3$ phase participates to the degradation based on the reaction between the perovskite type composite oxide and the oxide substrate. On the other hand, according to the invention, the perovskite type composite oxide is A-site defect type, so that the formation of $LaAlO_3$ phase can be suppressed to prevent the decomposition of the composite oxide and the decrease of specific surface area accompanied therewith.

Similarly, it has been reported that when the conventional perovskite type composite oxide is highly dispersed onto a surface of zirconia as a substrate, the solid phase reaction is caused between the composite oxide and zirconia at a high temperature region and hence the sufficient dispersion effect is not obtained (N. Mizuno et al., J. Am. Chem. Soc., vol. 114, 1992, p7151). However, such a solid phase reaction is sufficiently suppressed by using the A-site defect type perovskite structure composite oxide according to the invention likewise the aforementioned case.

Then, the degradation degree of the perovskite type composite oxide through the solid phase reaction is evaluated as an intensity ratio of X-ray diffraction peak of $LaAlO_3$ product phase to perovskite type composite oxide ($I[LaAlO_3]/I$ [perovskite type composite oxide]) with respect to the test samples endured at 1100° C. to obtain results as shown in Table 1.

TABLE 1

| | Composition of perovskite type composite oxide | $I[LaAlO_3]/$ I[perovskite type composite oxide] |
|---|---|---|
| Example 1 | $La_{0.9}Co_{0.5}Fe_{0.5}O_{3-\delta}$ | 0.03 |
| Example 2 | $La_{0.875}Co_{0.5}Fe_{0.5}O_{3-\delta}$ | 0.03 |
| Example 3 | $La_{0.85}CO_{0.5}Fe_{0.5}O_{3-\delta}$ | 0.03 |
| Example 4 | $La_{0.81}Ce_{0.09}Co_{0.5}Fe_{0.5}O_{3-\delta}$ | 0.03 |
| Example 5 | $La_{0.72}Sr_{0.18}Co_{0.5}Fe_{0.5}O_{3-\delta}$ | 0.03 |
| Example 6 | $La_{0.81}K_{0.09}Co_{0.5}Fe_{0.5}O_{3-\delta}$ | 0.04 |
| Example 7 | $La_{0.72}Ba_{0.18}Co_{0.5}Fe_{0.5}O_{3-\delta}$ | 0.04 |
| Example 8 | $La_{0.81}Pb_{0.09}Co_{0.5}Fe_{0.5}O_{3-\delta}$ | 0.05 |
| Example 9 | $La_{0.81}Pr_{0.09}Co_{0.5}Fe_{0.5}O_{3-\delta}$ | 0.03 |
| Example 10 | $La_{0.9}Co_{0.8}Fe_{0.2}O_{3-\delta}$ | 0.5 |
| Example 11 | $La_{0.9}CoO_{3-\delta}$ | 1.0 |
| Comparative Example 1 | $La_{1.0}Co_{0.5}Fe_{0.5}O_{3-\delta}$ | 0.07 |
| Comparative Example 2 | $La_{0.9}Sr_{0.1}Co_{0.5}Fe_{0.5}O_{3-\delta}$ | 0.08 |
| Comparative Example 3 | $La_{0.9}K_{0.1}Co_{0.5}Fe_{0.5}O_{3-\delta}$ | 0.09 |
| Comparative Example 4 | $La_{0.8}Ba_{0.2}Co_{0.5}Fe_{0.5}O_{3-\delta}$ | 0.08 |
| Comparative Example 5 | $La_{0.9}Pb_{0.1}Co_{0.5}Fe_{0.5}O_{3-\delta}$ | 0.1 |
| Comparative Example 6 | $La_{1.0}Co_{0.8}Fe_{0.2}O_{3-\delta}$ | 0.8 |
| Comparative Example 7 | $La_{1.0}Co_{1.0}O_{3-\delta}$ | 1.27 |

When α is not less than 0.2, the precipitation of a secondary phase is observed and hence a single phase of A-site defect type perovskite structure can not be obtained. As seen from Table 1, the compositions of Examples 1–11 are composite oxides of A-site defect type perovskite structure represented by the general formula of $(A'_{1-x}A''_x)_{1-\alpha}(B'_{1-y}B''_y)O_{3-\delta}$ as compared with the compositions of Comparative Examples 1–7 in which α, δ, x and y are 0<α<0.2, 0≦δ≦1, 0<x<1 and 0<y<1, so that it is possible to suppress the formation of $LaAlO_3$ to improve the durability of the perovskite type composite oxide.

Moreover, the feature that the valency significantly contributing to the catalytic action may effectively be controlled by rendering A-site into defect type can be proved from theoretical considerations using lattice defect theory. For instance, when the valency control for improving the catalytic activity of perovskite type oxide is explained with respect to $LaCoO_{3-\delta}$, the oxidation activity can largely be improved by replacing a part of $La^{+3}$ in A-site with $Sr^{+2}$, which is considered due to the fact that oxygen is reversibly gone in and out according to the following reaction formula based on an oxygen concentration in an atmosphere (Tanaka and Takahashi, Journal of the Society of Automotive Engineers of Japan, vol. 47, 1993, p51). $La^{3+}_{1-x}Sr^{2+}_xCo^{3+}_{1-x}Co^{4+}_xO_3 \leftarrow\rightarrow La^{3+}_{1-x}Sr^{2+}_xCo^{3+}_{1-x+2\delta}Co^{4+}_{x-2\delta}O_{3-\delta}+(1/2\delta)O_2$ Since the similar discussion is applicable to $LaMnO_{3-\delta}$, an oxygen vacancy amount δ is $1/2V_O^{++}$ when a part of La in A-site is replaced with $Sr^{2+}$, $V_O^{++}$ in case of replacing with $K^{+1}$, and $3/2V_O^{++}$ in case of replacing with vacancy of $La^{3+}$ (i.e. A-site defect), from which it is apparent that the entrance and exit of oxygen are controlled by replacing a part of valency in A-site with different valency.

The A-site defect according to the invention shows that the amount of oxygen vacancy introduced is larger than that by the conventional valency control such as replacement with Sr or K. This means that the valency can effectively be controlled even if an amount of replacing element badly affecting performances of noble metal catalyst carried is decreased. As a result, the formation of A-site defect in the perovskite structure is possible to provide composite oxides controlling the solid phase reaction to the substrate and having improved durability and catalytic activity.

In this connection, the following Test Example 2 shows that the invention is effective to the improvement of durability and catalytic activity in the perovskite type oxide.

TEST EXAMPLE 2

The degradation of catalytic activity based on the solid phase reaction to γ-alumina as a substrate is examined with respect to perovskite type oxides of Examples 12–15 and Comparative Examples 8–10 and 18. The effect of controlling the degradation of catalytic activity based on the solid phase reaction is judged by preparing a test sample and conducting evaluation under the following conditions.

(Process I for the evaluation of catalytic activity)
1) Preparation of Test Sample
(1) The composite oxide powder and γ-alumina are weighed so as to have a weight ratio of composite oxide powder: γ-alumina 1:2.
(2) These weighed powders are mixed in a mortar at a dry state for 1 hour.
(3) The mixed powder is endured by heating at 900° C. in air for 10 hours.
2) Evaluation of Reaction
(1) Gas for Reaction evaluation
$C_3H_6$: 2200 ppm
$O_2$: 4.5%
He: balance
(2) Evaluation of $C_3H_6$ purification performance
A temperature of attaining conversion ratio of 50% ($T_{50}$) is measured by raising reaction temperature.

The evaluated results on the catalytic activity in Examples 12–15 and Comparative Examples 8–10 and 18 are shown in Table 2.

TABLE 2

| | Composition of perovskite type composite oxide | $T_{50}$ (° C.) |
|---|---|---|
| Example 12 | $Nd_{0.9}Mn_{1.0}O_{3-\delta}$ | 330 |
| Example 13 | $La_{0.9}MnO_{3-\delta}$ | 331 |
| Example 14 | $La_{0.9}Mn_{0.5}Fe_{0.5}O_{3-\delta}$ | 308 |
| Example 15 | $La_{0.81}K_{0.09}Mn_{0.8}Cu_{0.2}O_{3-\delta}$ | 355 |
| Comparative Example 8 | $Nd_{1.0}Mn_{1.0}O_{3-\delta}$ | 341 |
| Comparative Example 18 | $La_{1.0}MnO_{3-\delta}$ | 338 |
| Comparative Example 9 | $La_{1.0}Mn_{0.5}Fe_{0.5}O_{3-\delta}$ | 315 |
| Comparative Example 10 | $La_{0.9}K_{0.1}Mn_{0.8}Cu_{0.2}O_{3-\delta}$ | 365 |

As seen from Table 2, $T_{50}$ is low and the catalytic activity is excellent in all examples as compared with the comparative examples, so that the formation of A-site defect is effective to improve the catalytic activity after the endurance.

The following Test Example 3 shows that the invention is effective to improve the durability of the perovskite type oxide after Pd is carried thereon.

TEST EXAMPLE 3

The degradation of catalytic activity based on the solid phase reaction to γ-alumina as a substrate is examined with respect to perovskite type oxides of Examples 16–22 and Comparative Examples 11–17. The effect of controlling the degradation of catalytic activity based on the solid phase reaction is judged by preparing a test sample and conducting evaluation under the following conditions.

(Process II for the evaluation of catalytic activity)
1) Preparation of Test Sample
(1) Two weight % of Pd is carried on the composite oxide powder by using a solution of palladium chloride.
(2) The Pd carried composite oxide powder and γ-alumina are weighed so as to have a weight ratio of Pd carried composite oxide powder: γ-alumina 1:2.
(3) These weighed powders are mixed in a mortar at a dry state for 1 hour.
(4) The mixed powder is endured by heating at 900° C. in air for 10 hours.
2) Evaluation of Reaction
(1) Gas for Reaction evaluation
$C_3H_6$: 2200 ppm
$O_2$: 4.5%
He: balance
(2) Evaluation of $C_3H_6$ purification performance
A temperature of attaining conversion ratio of 50% ($T_{50}$) is measured by raising reaction temperature.

The evaluated results on the catalytic activity in Examples 16–22 and Comparative Examples 11–17 are shown in Table 3.

TABLE 3

| | Composition of perovskite type composite oxide | $T_{50}$ (° C.) |
|---|---|---|
| Example 16 | $Y_{0.81}Ca_{0.09}MnO_{3-\delta}$ | 211 |
| Example 17 | $La_{0.81}Sr_{0.09}Mn_{0.9}Ti_{0.1}O_{3-\delta}$ | 215 |
| Example 18 | $Gd_{0.875}MnO_{3-\delta}$ | 210 |
| Example 19 | $La_{0.47}Sr_{0.47}Co_{0.98}Ni_{0.02}O_{3-\delta}$ | 223 |
| Example 20 | $La_{0.7}Sr_{0.175}Co_{0.8}Fe_{0.2}O_{3-\delta}$ | 220 |
| Example 21 | $La_{0.81}Sr_{0.09}Co_{0.93}Al_{0.05}O_{3-\delta}$ | 222 |
| Example 22 | $La_{0.81}Ba_{0.09}Co_{0.5}Mn_{0.5}O_{3-\delta}$ | 217 |
| Comparative Example 11 | $Y_{0.9}Ca_{0.1}Mn_{1.0}O_{3-\delta}$ | 217 |
| Comparative Example 12 | $La_{0.9}Sr_{0.1}Mn_{0.9}Ti_{0.1}O_{3-\delta}$ | 223 |
| Comparative Example 13 | $GdMnO_{3-\delta}$ | 218 |
| Comparative Example 14 | $La_{0.5}Sr_{0.5}Co_{0.98}Ni_{0.02}O_{3-\delta}$ | 228 |
| Comparative Example 15 | $La_{0.8}Sr_{0.2}Co_{0.8}Fe_{0.2}O_{3-\delta}$ | 225 |
| Comparative Example 16 | $La_{0.9}Sr_{0.1}Co_{0.95}Al_{0.05}O_{3-\delta}$ | 230 |
| Comparative Example 17 | $La_{0.9}Ba_{0.1}Co_{0.5}Mn_{0.5}O_{3-\delta}$ | 223 |

As seen from Table 3, $T_{50}$ is low and the catalytic activity is excellent in all examples as compared with the comparative examples, so that the formation of A-site vacancy is effective to improve the catalytic activity after the endurance, which means that it is effective to improve the durability of the perovskite type composite oxide after the carrying of Pd.

TEST EXAMPLE 4

In order to evaluate an oxygen extrusion behavior as an indication of the catalytic activity in the perovskite type oxide, a thermogravimetric analysis is carried out with respect to perovskite type composite oxides of Examples 1, 11, 13, 23 and 24 and Comparative Examples 7, 18 and 19. The comparison in the oxygen extrusion behavior between the composite oxide of A-site defect type perovskite structure according to the invention and the conventional perovskite type oxide is judged by the thermogravimetric analysis under the following conditions.

(Evaluation process)

1) Evaluation Device (1) TGA 7 made by Perkin-Elmer Corporation

2) Measuring conditions (1) Measuring temperature region: from room temperature to 1200° C.

(2) Measuring atmosphere: dry air (3) Temperature rising rate: 10° C./min

The results of thermogravimetric analysis on Examples 11 and 23 and Comparative Example 7 are shown in FIG. 2. In the composite oxide of $La_{0.9}Co_{1.0}O_{3-\delta}$ (Example 11), the oxygen extrusion performance is suppressed at a temperature region of 200 to 400° C. as compared with the conventional perovskite type oxide of $La_{0.1}Co_{1.0}O_{3-\delta}$ (Comparative Example 7). When the perovskite type composite oxide is actually used as a catalyst for the purification of exhaust gas, it is desired to further improve the catalytic activity in addition to the durability and thermal resistance. In this connection, it is understood from FIG. 2 that the oxygen extrusion performance at a temperature region of not higher than 700° C. is further improved in the composite oxide of A-site defect type perovskite structure of $La_{0.875}Co_{1.0}O_{3-\delta}$ (Example 23). Similarly, the comparison results of Examples 13 and 24 and Comparative Example 18 are shown in FIG. 3, and the comparison results of Examples 1 and 2 and Comparative Example 19 are shown in FIG. 4.

Figure 3:
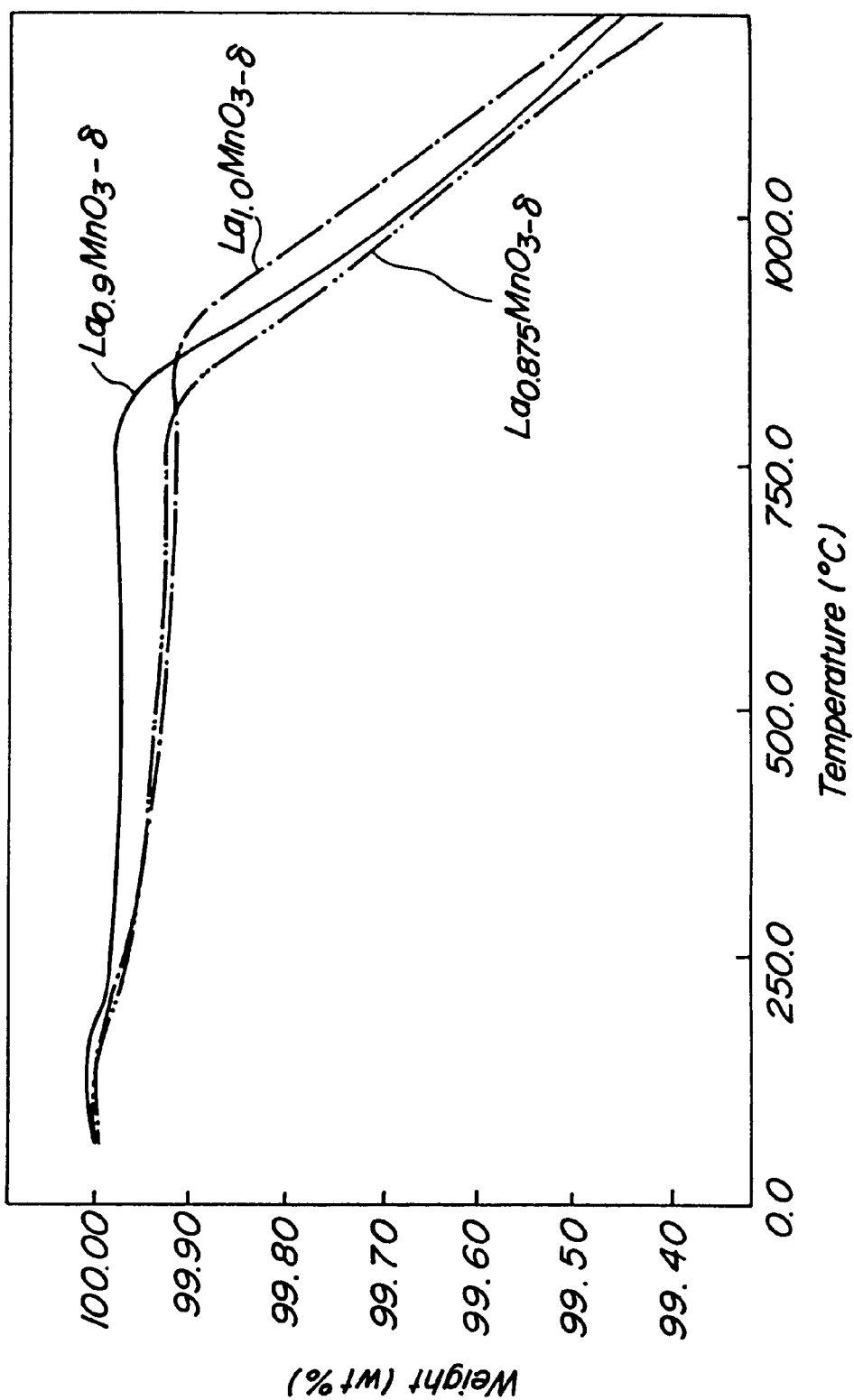
FIG. 3 is a graph showing results of thermogravimetric analysis on the conventional perovskite type oxide $La_{1.0}Mn_{1.0}O_{3-\delta}$ (Comparative Example 18) and A-site defect type perovskite structure composite oxides $La_{0.9}Mn_{1.0}O_{3-\delta}$ and $La_{0.875}Mn_{1.0}O_{3-\delta}$ according to the invention (Examples 13 and 24)
Figure 4:
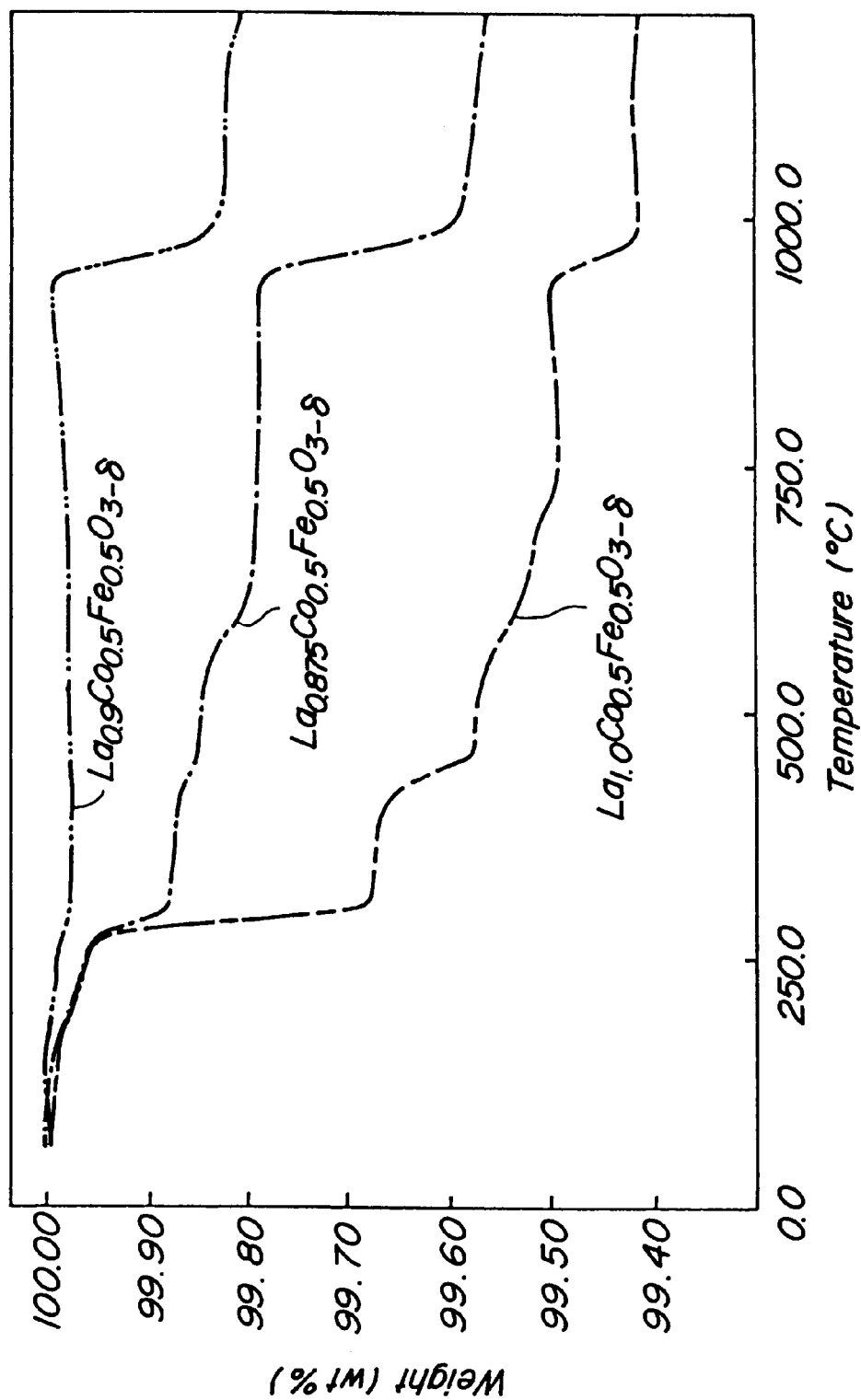
FIG. 4 is a graph showing results of thermogravimetric analysis on the conventional perovskite type oxide $La_{1.0}Co_{0.5}Fe_{0.5}O_{3-\delta}$ (Comparative Example 19) and A-site defect type perovskite structure composite oxides $La_{0.9}Co_{0.5}Fe_{0.5}O_{3-\delta}$ and $La_{0.875}Co_{0.5}Fe_{0.5}O_{3-\delta}$ according to the invention (Examples 1 and 2)

As seen from the results of FIGS. 2–4, when an amount of A-site defect $\alpha$ is $0.1<\alpha<0.15$, there are obtained composite oxides of A-site defect type perovskite structure having a more improved oxygen extrusion performance.

The following Test Example 5 shows that the invention is particularly effective to improve the durability and catalytic activity of the perovskite type composite oxide when an amount of A-site defect $\alpha$ is $0.1<\alpha<0.15$.

TEST EXAMPLE 5

The degradation of catalytic activity based on the solid phase reaction to γ-alumina as a substrate is examined with respect to perovskite type oxides of Examples 23–24, 2, 25–32 and respective Comparative Examples 7, 18–20, 2–3, 21, 5, 8, 22 and 10. The effect of controlling the degradation of catalytic activity based on the solid phase reaction is judged by the endurance and evaluation under the same conditions as in the process I for the evaluation of catalytic activity of Test Example 2.

Table 4 shows the evaluated results on the catalytic activity in Examples 23–24, 2, 25–32 and respective Comparative Examples 7, 18–20, 2–3, 21, 5, 8, 22 and 10. As seen from Table 4, $T_{50}$ is low and the catalytic activity is excellent in all examples as compared with the respective comparative examples, so that the A-site defect amount of $0.1<\alpha<0.15$ is effective to improve the catalytic activity after the endurance.

TABLE 4

| | Composition of perovskite type composite oxide | $T_{50}$ (° C.) |
|---|---|---|
| Example 23 | $La_{0.875}CoO_{3-\delta}$ | 358 |
| Example 24 | $La_{0.875}MnO_{3-\delta}$ | 328 |
| Exmaple 2 | $La_{0.875}Co_{0.5}Fe_{0.5}O_{3-\delta}$ | 337 |
| Example 25 | $La_{0.78}Ce_{0.1}Co_{0.5}Fe_{0.5}O_{3-\delta}$ | 335 |
| Example 26 | $La_{0.78}Sr_{0.1}Co_{0.5}Fe_{0.5}O_{3-\delta}$ | 333 |
| Example 27 | $La_{0.78}K_{0.1}Co_{0.5}Fe_{0.5}O_{3-\delta}$ | 351 |
| Example 28 | $La_{0.78}Ba_{0.1}Co_{0.5}Fe_{0.5}O_{3-\delta}$ | 347 |
| Example 29 | $La_{0.78}Pb_{0.1}Co_{0.5}Fe_{0.5}O_{3-\delta}$ | 334 |
| Example 30 | $Nd_{0.875}MnO_{3-\delta}$ | 326 |
| Example 31 | $La_{0.455}Ba_{0.42}Mn_{0.5}Fe_{0.5}O_{3-\delta}$ | 319 |
| Exmaple 32 | $La_{0.78}K_{0.1}Mn_{0.8}Cu_{0.2}O_{3-\delta}$ | 350 |
| Comparative Example 7 | $La_{1.0}CoO_{3-\delta}$ | 370 |
| Comparative Example 18 | $La_{1.0}MnO_{3-\delta}$ | 338 |
| Comparative Example 19 | $La_{1.0}Co_{0.5}Fe_{0.5}O_{3-\delta}$ | 345 |
| Comparative Example 20 | $La_{0.9}Ce_{0.1}Co_{0.5}Fe_{0.5}O_{3-\delta}$ | 340 |
| Comparative Example 2 | $La_{0.9}Sr_{0.1}Co_{0.5}Fe_{0.5}O_{3-\delta}$ | 342 |
| Comparative Example 3 | $La_{0.9}K_{0.1}Co_{0.5}Fe_{0.5}O_{3-\delta}$ | 360 |
| Comparative Example 21 | $La_{0.9}Ba_{0.1}Co_{0.5}Fe_{0.5}O_{3-\delta}$ | 357 |
| Comparative Example 5 | $La_{0.9}Pb_{0.1}Co_{0.5}Fe_{0.5}O_{3-\delta}$ | 344 |
| Comparative Example 8 | $NdMnO_{3-\delta}$ | 341 |
| Comparative Example 22 | $La_{0.5}Ba_{0.5}Mn_{0.5}Fe_{0.5}O_{3-\delta}$ | 325 |
| Comparative Example 10 | $La_{0.9}K_{0.1}Mn_{0.8}Cu_{0.2}O_{3-\delta}$ | 365 |

The following Test Example 6 shows that the invention is particularly effective to improve the durability of the perovskite type composite oxide after Pd is carried thereon when an amount of A-site defect $\alpha$ is $0.1<\alpha<0.15$.

TEST EXAMPLE 6

The degradation of catalytic activity based on the solid phase reaction to γ-alumina as a substrate is examined with respect to perovskite type oxides of Examples 33–38 and Comparative Examples 11–14 and 16–17 after Pd is carried. The effect of controlling the degradation of catalytic activity based on the solid phase reaction is judged by the endurance and evaluation under the same conditions as in the process II for the evaluation of catalytic activity of Test Example 3.

Table 5 shows the evaluated results on the catalytic activity in Examples 33–38 and Comparative Examples 11–14 and 16–17. As seen from Table 5, $T_{50}$ is low and the catalytic activity is excellent in all examples as compared with the comparative examples, so that the A-site defect amount of $0.1<\alpha<0.15$ is effective to improve the catalytic activity after the endurance, which means that it is effective to improve the durability of the perovskite type composite oxide after the carrying of Pd.

TABLE 5

| | Composition of perovskite type composite oxide | $T_{50}$ (° C.) |
|---|---|---|
| Example 33 | $Y_{0.78}Ca_{0.1}MnO_{3-\delta}$ | 203 |
| Example 34 | $La_{0.78}Sr_{0.1}Mn_{0.9}Ti_{0.1}O_{3-\delta}$ | 210 |
| Example 35 | $Gd_{0.78}Pr_{0.1}MnO_{3-\delta}$ | 207 |
| Example 36 | $La_{0.44}Sr_{0.44}Co_{0.98}Ni_{0.02}O_{3-\delta}$ | 220 |

TABLE 5-continued

| | Composition of perovskite type composite oxide | $T_{50}$ (° C.) |
|---|---|---|
| Example 37 | $La_{0.78}Sr_{0.1}Co_{0.95}Al_{0.05}O_{3-\delta}$ | 220 |
| Example 38 | $La_{0.78}Ba_{0.1}Co_{0.5}Mn_{0.5}O_{3-\delta}$ | 215 |
| Comparative Example 11 | $Y_{0.9}Ca_{0.1}Mn_{1.0}O_{3-\delta}$ | 217 |
| Comparative Example 12 | $La_{0.9}Sr_{0.1}Mn_{0.9}Ti_{0.1}O_{3-\delta}$ | 223 |
| Comparative Example 13 | $GdMnO_{3-\delta}$ | 218 |
| Comparative Example 14 | $La_{0.5}Sr_{0.5}Co_{0.98}Ni_{0.02}O_{3-\delta}$ | 228 |
| Comparative Example 16 | $La_{0.9}Sr_{0.1}Co_{0.95}Al_{0.05}O_{3-\delta}$ | 230 |
| Comparative Example 17 | $La_{0.9}Ba_{0.1}Co_{0.5}Mn_{0.5}O_{3-\delta}$ | 223 |

TEST EXAMPLE 6

Each of the perovskite type composite oxide powders of Examples 39–49 and Comparative Examples 7, 19 and 23–27 is baked onto a solid electrolyte ($Ce_{0.9}Ca_{0.1}O_{2-\delta}$) to form a cell for evaluation, which is used to measure an electromotive force. A temperature when the measured electromotive force meets with a theoretically electromotive force according to Nernst's equation is an operation starting temperature $T_{Ne}$(°C.) of the cell. By using the operation starting temperature $T_{Ne}$(°C.) is evaluated the characteristic of each perovskite type oxide as an electrode. The evaluation method and conditions are as follows:

(Process for the measurement of electromotive force)

1) Preparation of Cell for Evaluation

Figure 5:
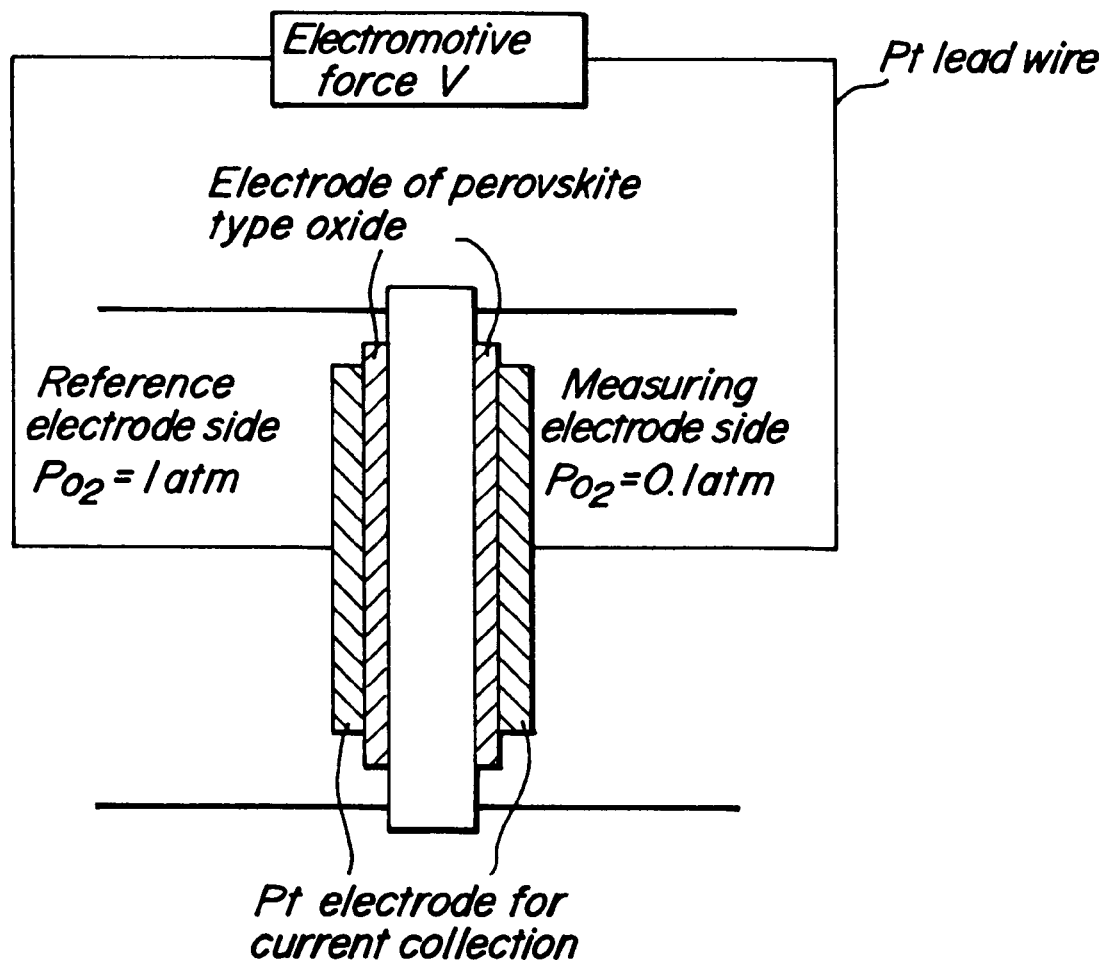
FIG. 5 is a diagrammatical view of an electrochemical cell used for the measurement of electromotive force.

The evaluation cell for an oxygen sensor is diagrammatically shown in FIG. 5. The formation of such an electrochemically measuring cell is as follows:

(1) The perovskite type composite oxide powder is adequately mixed with turpentine oil to form a paste.

(2) The paste is applied to a solid electrolyte and dried.

(3) The thus obtained electrode is baked by heating in air at 850° C. for 1 hour.

2) Conditions for the Evaluation

An oxygen gas of 1 atm is flown in a reference electrode side, while a gas of 10% $O_2$-$N_2$ is flown in a measuring electrode side, during which an electromotive force is measured to evaluate the characteristic of the electrode.

3) The Endurance of the Measuring Cell is Carried Out by Annealing in Air at 1000° C. or 1200° C. for 2 Hours.

The measured results on the operation starting temperature in the above examples and comparative examples are shown in Table 6.

TABLE 6

| | Composition of perovskite type composite oxide | Operation starting temperature before endurance $T_{NE}$ (° C.) |
|---|---|---|
| Example 39 | $La_{0.81}Sr_{0.09}CoO_{3-\delta}$ | 350 |
| Example 40 | $La_{0.54}Sr_{0.36}CoO_{3-\delta}$ | 295 |
| Example 41 | $La_{0.54}Sr_{0.36}Co_{0.8}Fe_{0.2}O_{3-\delta}$ | 315 |
| Example 42 | $La_{0.54}Sr_{0.36}Co_{0.8}Mn_{0.2}O_{3-\delta}$ | 302 |
| Example 43 | $La_{0.54}Sr_{0.36}Co_{0.5}Mn_{0.5}O_{3-\delta}$ | 310 |
| Example 44 | $La_{0.54}Sr_{0.36}Co_{0.2}Mn_{0.8}O_{3-\delta}$ | 320 |
| Example 45 | $La_{0.81}Ba_{0.09}Co_{0.5}Fe_{0.5}O_{3-\delta}$ | 398 |
| Example 46 | $Nd_{0.54}Sr_{0.36}Mn_{0.8}Fe_{0.2}O_{3-\delta}$ | 330 |
| Example 47 | $La_{0.54}Sr_{0.36}Mn_{0.8}Cu_{0.2}O_{3-\delta}$ | 327 |

TABLE 6-continued

| | Composition of perovskite type composite oxide | Operation starting temperature before endurance $T_{NE}$ (° C.) |
|---|---|---|
| Example 48 | $Y_{0.81}Ca_{0.09}Mn_{0.8}Co_{0.2}O_{3-\delta}$ | 340 |
| Example 49 | $La_{0.54}Sr_{0.36}Co_{0.9}Ni_{0.1}O_{3-\delta}$ | 315 |
| Comparative Example 7 | $La_{1.0}Co_{1.0}O_{3-\delta}$ | 648 |
| Comparative Example 23 | $La_{0.8}Sr_{0.2}CoO_{3-\delta}$ | 355 |
| Comparative Example 24 | $La_{0.6}Sr_{0.4}CoO_{3-\delta}$ | 305 |
| Comparative Example 25 | $La_{0.6}Sr_{0.4}Co_{0.8}Fe_{0.2}O_{3-\delta}$ | 325 |
| Comparative Example 26 | $La_{0.6}Sr_{0.4}Co_{0.5}Mn_{0.5}O_{3-\delta}$ | 320 |
| Comparative Example 19 | $La_{0.9}Ba_{0.1}Co_{0.5}Fe_{0.5}O_{3-\delta}$ | 410 |
| Comparative Example 27 | $Y_{0.9}Ca_{0.1}Mn_{0.8}Co_{0.2}O_{3-\delta}$ | 350 |

As seen from Table 6, the composite oxides of A-site defect type perovskite structure represented by $(A'_{1-x}A''_x)_{1-\alpha}(B'_{1-y}B''_y)O_{3-\delta}$ in Examples 39–49 are possible to lower the operation starting temperature of the oxygen sensor as compared with the perovskite type oxides of Comparative Examples 7, 19 and 23–27 because the introduction of carrier can effectively be conducted to convert the semiconductive state into metallic state by the formation of A-site defect, which means that the electrical conductivity of the electrode material is enhanced to mitigate the contact resistance with the solid electrolyte and reduce the resistance to electrode reaction.

The durability of the measuring cell is measured to obtain results as shown in Table 7.

TABLE 7

| | Composition of perovskite type composite oxide | Operation starting temperature before endurance $T_{Ne}$ (° C.) | Operation starting temperature after endurance in air at 1200° C. for 2 hours $T_{Ne}$ (° C.) |
|---|---|---|---|
| Example 46 | $Nd_{0.54}Sr_{0.36}Mn_{0.8}Fe_{0.2}O_{3-\delta}$ | 330 | 380 |
| Example 47 | $La_{0.54}Sr_{0.36}Mn_{0.8}Cu_{0.2}O_{3-\delta}$ | 327 | 390 |
| Example 48 | $Y_{0.81}Ca_{0.09}Mn_{0.8}Co_{0.2}O_{3-\delta}$ | 340 | 400 |
| Comparative Example 27 | $Y_{0.9}Ca_{0.1}Mn_{0.8}Co_{0.2}O_{3-\delta}$ | 350 | 450 |

As seen from Table 7, the composite oxides of A-site defect type perovskite structure as shown in Examples 46–48 after the endurance by heating control the degradation of the property at the interface between solid electrolyte and electrode to suppress the rise of resistance to electrode reaction, whereby the deterioration of the operation starting temperature is considerably prevented to improve the durability.

The effect of adding a fluorite type oxide such as ceria or zirconia to the perovskite type composite oxide for the improvement of the durability is examined to obtain results as shown in Table 8.

TABLE 8

| Composition of perovskite type composite oxide | Operation starting temperature before endurance $T_{Ne}$ (° C.) | Operation starting temperature after endurance in air at 1200° C. for 2 hours $T_{Ne}$ (° C.) |
| --- | --- | --- |
| Example 50 | $La_{0.54}Sr_{0.36}CoO_{3-\delta}$ + $CeO_{2-x}$ | 275 | 330 |
| Example 51 | $La_{0.54}Sr_{0.36}Mn_{0.8}Co_{0.2}O_{3-\delta}$ + $CeO_{2-x}$ | 300 | 350 |
| Example 52 | $La_{0.54}Sr_{0.36}CoO_{3-\delta}$ + $CeO_{2-x}$ + $Zr_{0.9}Y_{0.1}O_{2-x}$ | 270 | 320 |
| Comparative Example 28 | $La_{0.6}Sr_{0.4}CoO_{3-\delta}$ + $CeO_{2-x}$ | 280 | 360 |

The operation starting temperature can be further lowered by adding the fluorite type oxide as a second component, but the degradation of the characteristic may be observed by the endurance. As shown in Table 8, however, it is possible to control the degradation of the characteristic after the endurance to improve the thermal resistance by using the combination of the composite oxide of A-site defect type perovskite structure as shown in Examples 52–54 and the fluorite type oxide as an electrode material as compared with the combination of the perovskite type oxide of Comparative Example 28 and the fluorite type oxide.

As mentioned above, the composite oxide of A-site defect type perovskite structure according to the invention is represented by a rational formula of $A_{1-\alpha}BO_{3-\delta}$, particularly $(A'_{1-x}A''_x)_{1-\alpha}(B'_{1-y}B''_y)O_{3-\delta}$, wherein $\alpha$, $\delta$, x and y are $0<\alpha<0.2$, preferably $0.1<\alpha<0.15$, $0\leq\delta\leq1$, $0<x<1$ and $0<y<1$, which controls the formation of $LaAlO_3$ based on solid phase reaction to a carrier substrate to provide excellent catalytic activity and durability. Furthermore, the valency control of B-site element significantly contributing to the electrode action is effectively acted by the A-site defect to enhance the electrical conductivity of an electron-ion mixed conductor and improve the electrode properties when such a composite oxide is used as an electrode material.

What is claimed is:

1. A catalyst for purifying exhaust gas discharged from an internal combustion engine comprising:
a catalyst carrier substrate comprising γ-alumina or zirconia; and
a composite oxide of A-site defect perovskite structure represented by the following general formula:

$A_{1-\alpha}BO_{3-\delta}$ wherein A is at least one element selected from the group consisting of alkali metals, alkaline earth metals, rare earth elements, Y and Pb, and B is at least one element selected from the group consisting of Mn, Co, Ti, Fe, Ni, Cu and Al, and $0.12\leq\alpha\leq0.15$, $0<\delta\leq1$.

2. A catalyst according to claim 1, wherein the catalyst carrier substrate consists essentially of γ-alumina or zirconia.

3. A catalyst according to claim 1, wherein the catalyst carrier substrate consists of γ-alumina or zirconia.

4. A catalyst according to claim 1, wherein the perovskite is represented by the following general formula:

$A_{1-\alpha}(B'_{1-y}B''_y)O_{3-\delta}$ wherein B' in said general formula is Co, and B" in said general formula is at least one element selected from the group consisting of Mn, Fe, Ni and Al and $0.12\leq\alpha\leq0.15$, $0<\delta\leq1$ and $0<y<1$.

5. A catalyst according to claim 1, wherein the perovskite is represented by the following general formula:

$A_{1-\alpha}(B'_{1-y}B''_y)O_{3-\delta}$ wherein B' in said general formula is Mn, and B" in said general formula is at least one element selected from the group consisting of Fe, Ti, and Cu and $0.12\leq\alpha\leq0.15$, $0<\delta\leq1$ and $0<y<1$.

6. A catalyst according to claim 4, wherein at least Pd as a noble metal is carried on said composite oxide.

7. A catalyst according to claim 5, wherein at least Pd as a noble metal is carried on said composite oxide.

8. A catalyst according to claim 1, wherein the perovskite structure is represented by the following general formula:

$(A'_{1-x}A''_x)_{1-\alpha}(B'_{1-y}B''_y)O_{3-\delta}$ wherein A' is at least one element selected from the group consisting of La, Nd, Gd and Y, and A" is at least one element selected from the group consisting of Pr, Ce, Ba, Sr, Ca and K, and B' and B" are different and are at least one element selected from the group consisting of Mn, Co, Ti, Fe, Ni, Cu and Al, and $0.12\leq\alpha\leq0.15$, $0\leq\delta\leq1$, $0<x<1$ and $0<y<1$.

9. A catalyst for purifying exhaust gas discharged from an internal combustion engine comprising:
a catalyst carrier substrate of an internal combustion engine comprising zirconia; and
a composite oxide of A-site defect perovskite structure represented by the following general formula:

$A_{1-\alpha}BO_{3-\delta}$ wherein A is at least one element selected from the group consisting of alkali metals, alkaline earth metals, rare earth elements, Y and Pb, and B is at least one element selected from the group consisting of Mn, Co, Ti, Fe, Ni, Cu and Al, and $0.12\leq\alpha\leq0.15$, $0<\delta\leq1$.

* * * * *